Figure 1:
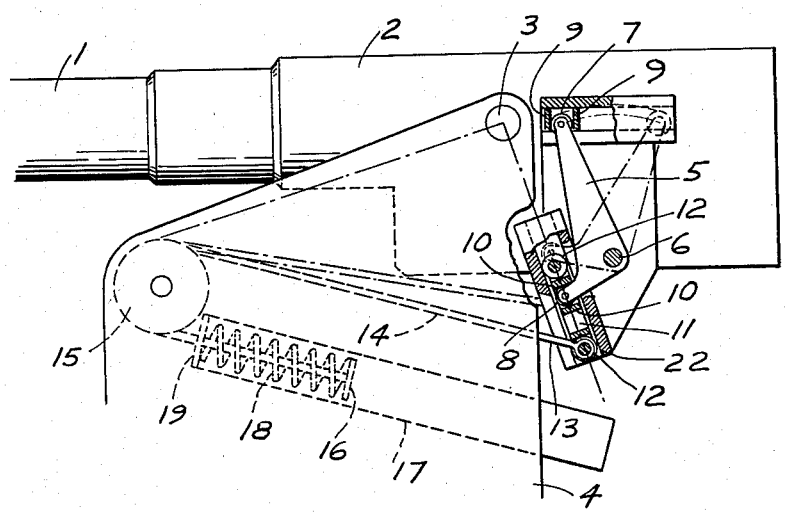

Nov. 15, 1960     H. W. ALDRIN     2,960,010
DEVICE FOR BALANCING THE ELEVATING MASS OF A RECOILING GUN
Filed May 26, 1958

INVENTOR.
HENRY WILHELM ALDRIN
BY
ATTORNEYS

2,960,010

DEVICE FOR BALANCING THE ELEVATING MASS OF A RECOILING GUN

Henry Wilhelm Aldrin, Bofors, Sweden, assignor to Aktiebolaget Bofors, Bofors, Sweden, a company of Sweden Filed May 26, 1958, Ser. No. 737,905

Claims priority, application Sweden May 31, 1957

6 Claims. (Cl. 89—37)

The present invention relates to a device for balancing the elevating mass of a gun in any position of elevation, and more particularly to the elevating mass of an automatic recoiling gun with high rate of fire.

It is known to couple the elevating mass of the gun, that is, the parts participating in the elevation or depression of the gun barrel to the mount of the gun by a spring system which is designed to compensate for the changes in the location of the center of gravity of the elevating mass in relation to the rotational axis of the trunnions of the gun mount. As is evident, the location of the center of gravity will change when the elevation of the gun barrel is changed and also during the runout and the recoil of the barrel. The location of the center of gravity is usually somewhat in front of the rotational axis of the trunnions but moves during elevation and runout or recoil of the barrel.

The spring system is generally designed to increase the spring force when the elevating mass is depressed and to reduce the spring force when the elevating mass is raised. The system is coupled to the elevating mass in a manner such that its torque leverage is increased during the runout of the barrel and reduced during recoil. By appropriately dimensioning the spring system and the parts associated therewith balance can be obtained in theory for all elevational angles of the elevating mass and all positions of the recoiling parts of the gun.

In arrangements of the general kind above referred to, the variations of the torque leverage as a function of the runout and recoil movements of the gun are usually obtained by providing on the parts of the gun participating in the recoil a gear rack which through a gear transmission drives a screw spindle mounting a nut held against turning and to which the spring force is transmitted.

Devices of such design tend to be cumbersome and heavy. Especially, they cannot be used for automatic guns with high rate of fire. The balancing forces required for such guns are so high that the gears of the transmission would need dimensions which are not possible in practice.

Accordingly, it is an object of the invention to provide a novel and improved balancing device of the general kind above referred to, which is rugged yet comparatively light and which affords full balance compensation in all elevational positions of the barrel and also in all recoil positions of the respective gun parts.

Another object of the invention is to provide a novel and improved balancing device which due to its light and rugged design is suitable for use with automatic recoiling guns with high rate of fire.

Still another object of the invention is to provide a novel and improved balancing device which can be conveniently and safely installed on the elevating mass of the gun and the gun mount.

Other and further objects, features and advantages of the invention will be pointed out hereinafter and set forth in the appended claims forming part of the application.

In the accompanying drawing, several preferred embodiments of the invention are shown by way of illustration and not by way of limitation.

Figure 2:
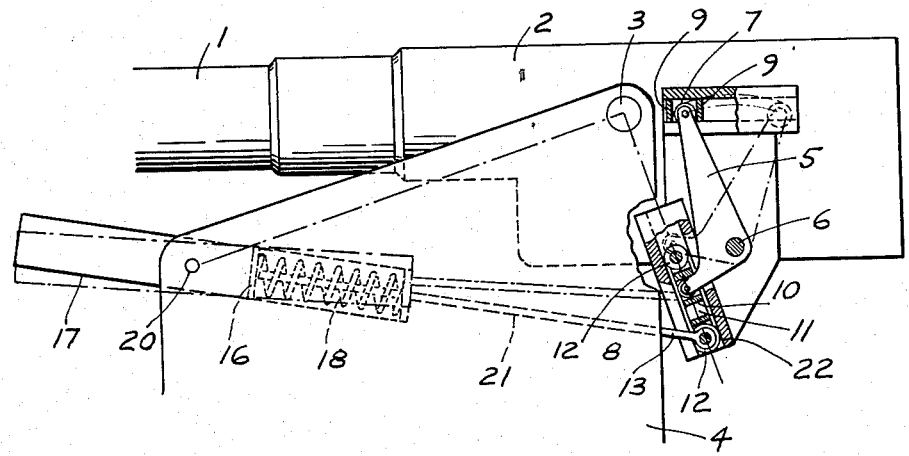

In the drawing:

Fig. 1 is a diagrammatic elevational view, partly in section, of a balancing device installed on a recoiling gun, and Fig. 2 is a view similar to Fig. 1, but showing a modification of the balancing device.

Referring first to Fig. 1 in detail, this figure shows a gun barrel 1 movably supported in a breech casing 2. The casing is pivotally supported in trunnions indicated at 3 which in turn are mounted on the gun mount 4 only diagrammatically shown. As is evident, the breech casing and with it the gun barrel can be elevated or depressed by turning it about the rotational axis of the trunnions, and the gun parts supported by the trunnions constitute the elevating mass of the gun.

The balancing device according to the invention comprises a bell-crank lever 5 pivotal about a pivot 6 mounted on the breech casing 2. The end of each arm of lever 5 mounts rollers 7 and 8 respectively. Roller 7 is guided between guides 9 which should be visualized as being secured to or constituting part of a recoiling part of the gun. Roller 7 is so guided that it may travel along a slightly arcuate path. Roller 8 is guided between guides 10 formed by a slide 11. By means of rollers 12 this slide is slidable along a straight path in guide tracks 22. The guide tracks and with it the path of slide 11 are so oriented that the slide is movable along a radial line through the rotational center of trunnions 3. A cable or rope 14 is secured to a fastener 13 by any appropriate means such as swaging and the fastener 13 is pivotally connected to the slide 11. The entire slide assembly 10, 11 and 12 is secured to the elevating mass for arcuate movement in unison therewith about the rotational axis of the barrel.

Cable 14 is guided over a pulley 15 supported by the mount 14 and terminates in an end plate 16 slidable within a cylinder 17, also supported by the gun mount. A compression loaded spring 18 within the cylinder abuts at one end against terminal plate 16 and at the other end against the bottom 19 of cylinder 17. Pulley 15 is so located and dimensioned that a tangential line between the rotational axis of the barrel and the periphery of the pulley defines a right angle with the radial line along which slide 11 and with it roller 8 can move. Barrel 1 is shown in the horizontal position and it is presumed that the recoiling parts of the gun are in the runout position. The spring force is so dimensioned that in the horizontal position of the barrel and in the runout position of the recoiling parts the pull exerted by spring 18 upon cable 14 balances the elevating mass by means of the torque or moment of rotation it exerts upon the same.

As is evident, when the barrel is elevated from the horizontal position, roller 12 will follow an arcuate path in clockwise direction. As a result, the compression loaded spring will extend into cylinder 17 whereby the pull upon cable 14 is correspondingly slackened. The spring tension is preferably so selected that in about the perpendicular position of the gun barrel the spring tension is zero, or in other words, the balancing force exerted by the spring upon the elevating mass varies continually and as a function of the elevational position of the gun barrel.

During the recoil and runout movements of the gun barrel roller 7 will follow the same and as a result turn bell-crank lever 5 in clockwise or counterclockwise direction depending upon the momentary direction of movement of the respective gun parts. As a result, slide 11 will move toward trunnions 3 during the recoil movement and away from the same during the runout movement. The figure indicates in dotted lines the resulting displacement of lever 5, slide 11 and cable 14. An analysis of the cable positions in the two indicated positions of lever 5, which are substantially the two limit positions of the lever, shows that the loading of spring 18 remains substantially unchanged. However the torque leverage with which the spring acts upon the elevating mass changes materially during the recoil movement and in a direction such that the displacement of the center of gravity due to the movements of the recoiling parts is compensated.

It should be noted in connection with Fig. 1 that cylinder 17 can be conveniently mounted upon gun mount 4. The mounting of the other components of the balancing device is equally simple.

The device of Fig. 2 employs the same principle and accordingly the same reference numerals are used to designate corresponding parts. The structure of Fig. 2 differs from the structure of Fig. 1 in that cylinder 17 is not fixed on the gun mount as in Fig. 1 but is pivotal about a pivot 20. A line connecting pivot 20 and the rotational axis of the barrel again defines a right angle with guide 22. The cable or rope 14 of Fig. 1 is replaced by a rigid bar 21. The function of the structure of Fig. 2 is obvious from the previous description. The structure affords the advantage that the spring force is always directed through a spatially stationary point, namely the center axis of pivot 20.

While the invention has been described in detail with respect to certain now preferred examples and embodiments of the invention it will be understood by those skilled in the art after understanding the invention that various changes and modifications may be made without departing from the spirit and scope of the invention and it is intended therefore, to cover all such changes and modifications in the appended claims.

What is claimed as new and desired to be secured by Letters Patent is:

1. A device for balancing the elevating mass of a recoiling gun in all positions of elevation and recoil, said device comprising, in combination, a gun mount having a bearing for supporting the elevating mass for rotation about a rotational axis, an elongated guide secured to the elevating mass for arcuate movement in unison therewith about said rotational axis, said guide extending radially outwardly from said rotational axis, a slide slidably supported within said guide, a bell-crank lever pivotally mounted upon a non-recoiling part of the elevating mass, said bell-crank lever having a pair of angularly related arms, one of said arms of said bell-crank lever being connected in motion transmitting relationship with said slide for effecting longitudinal movement of said slide within said guide, the other one of said arms of said bell-crank lever engaging a recoiling part of the elevating mass for effecting pivotal movement of said lever in proportion to the recoil movement of said recoiling part, said bell-crank lever constituting a balancing force-transmitting transmission link between said recoiling gun part and said slide, the ratio of transmission of force being controlled by the angular position of said lever relative to said guide, said position being varied by and during the recoil movement of said gun, and balancing spring means acting between said guide and said mount, said spring means including a spring secured at one end to the mount and a spring force transmitting means connecting the opposite end of the spring to said slide guide whereby the tension of said spring is controlled by the angular position of the elevating mass relative to the mount.

2. A balancing device according to claim 1 wherein said spring comprises a pre-loaded compression spring, the loading of said spring and the rotational moment of the elevating mass about its rotational axis being correlated so that the spring force and said moment balance each other in the horizontal position of the elevating mass, the arcuate movement of the slide guide during elevation of the mass above said position causing a corresponding decrease of the spring load.

3. A balancing device according to claim 1 wherein said spring means comprises a pre-loaded compression coil spring, one end of said spring abutting against an abutment stationary on the mount, and wherein said spring force transmitting means comprise a cable secured at one end to said slide guide and a cable guide guiding the cable to exert upon the slide guide a pull causing a moment of rotation of the elevating mass in the direction opposite to the direction of the moment of rotation in which the center of gravity of the elevating mass tends to turn the latter about said rotational axis.

4. A balancing device according to claim 1 wherein said spring means comprise a loaded coil spring, a sleeve housing the spring with one end of the spring abutting against one end of the sleeve, and mounting means pivotally supporting the sleeve on the mount, and wherein said spring force transmitting means comprise a rigid bar connecting said slide guide and the other end of the spring to exert upon the slide guide a pull causing a moment of rotation of the elevating mass in the direction opposite to the direction of the moment of rotation in which the center of gravity of the elevating mass tends to turn the latter about said rotational axis.

5. A balancing device according to claim 4 wherein the pivotal axis of said sleeve mounting, said spring and the point at which said bar engages said slide guide are disposed substantially in linear arrangement.

6. A device for balancing the elevating mass of a recoiling gun in all positions of elevation and recoil, said device comprising, in combination, a gun mount having a bearing for supporting the elevating mass for rotation about a rotational axis, an elongated guide secured to the elevating mass for arcuate movement in unison therewith about said rotational axis, said guide extending radially outwardly from said rotational axis, a slide slidably supported within said guide, a bell-crank lever pivotally mounted upon a non-recoiling part of the elevating mass, said bell-crank lever having a pair of angularly related arms, one of said arms of said bell-crank lever being connected in motion transmitting relationship with said slide for effecting longitudinal movement of said slide within said guide, the other one of said arms of said bell-crank lever engaging a recoiling part of the elevating mass for effecting pivotal movement of said lever in proportion to the recoil movement of said recoiling part, said bell-crank lever constituting a balancing force-transmitting transmission link between said recoiling gun part and said slide, the ratio of transmission of force being controlled by the angular position of said lever relative to said guide, said position being varied by and during the recoil movement of said gun, and balancing spring means acting between said guide and said mount, said spring means including a spring secured at one end to the mount and a spring force transmitting means connecting the opposite end of the spring to said slide guide whereby the tension of said spring is controlled by the angular position of the elevating mass relative to the mount, said spring means comprising a pre-loaded compression coil spring, an abutment stationary with said mount, one end of said pre-loaded compression coil spring abutting against said abutment, said spring force transmitting means comprising a cable, one end of said cable being secured to said slide guide, a cable guide guiding the cable to effect a longitudinal pull upon said slide guide to provide the elevating mass with a moment of rotation in a direction opposite to the direction of the moment of rotation of the center of gravity of the elevating mass about said rotational axis, and a sleeve secured to the mount, said abutment comprising one end of said sleeve, and said cable extending into said sleeve and secured to the opposite end of said spring.

References Cited in the file of this patent

UNITED STATES PATENTS

| | | |
|---|---|---|
| 1,724,183 | Dabrasky et al. | Aug. 13, 1929 |
| 2,564,360 | Hammar et al. | Aug. 14, 1951 |